United States Patent [19]

Haug et al.

[11] 4,023,246
[45] May 17, 1977

[54] INSERTED BLADE HOB

[75] Inventors: Edward W. Haug; Charles E. Beck, both of Rockford, Ill.

[73] Assignee: Barber-Colman Company, Rockford, Ill.

[22] Filed: Aug. 28, 1975

[21] Appl. No.: 608,585

[52] U.S. Cl. .............................................. 29/103 B
[51] Int. Cl.² .......................................... B26D 1/12
[58] Field of Search .............. 29/95, 103 R, 103 B, 29/105 R

[56] References Cited

UNITED STATES PATENTS

| | | | |
|---|---|---|---|
| 2,325,746 | 8/1943 | Curtis | 29/105 R |
| 2,357,088 | 8/1944 | Curtis | 29/103 R |
| 2,361,995 | 11/1944 | Curtis | 29/103 R |
| 2,407,519 | 9/1946 | Slater | 29/105 R |
| 2,607,108 | 8/1952 | See | 29/105 R |

FOREIGN PATENTS OR APPLICATIONS

| | | | |
|---|---|---|---|
| 1,109,632 | 9/1955 | France | 29/103 B |
| 22,518 | 10/1957 | Germany | 29/103 B |
| 1,627,092 | 4/1970 | Germany | 29/103 B |

OTHER PUBLICATIONS

Araldite, *A New Adhesive Coating and Casting Resin*, by C. J. Moss, British Plastics Magazine, Nov. 1948, pp. 521–526.

*Primary Examiner*—Harrison L. Hinson
*Attorney, Agent, or Firm*—A. Richard Koch

[57] ABSTRACT

High-speed tool steel cutting blades are inserted in slots in an inexpensive core and retained therein by a high-strength structural anaerobic adhesive.

3 Claims, 5 Drawing Figures

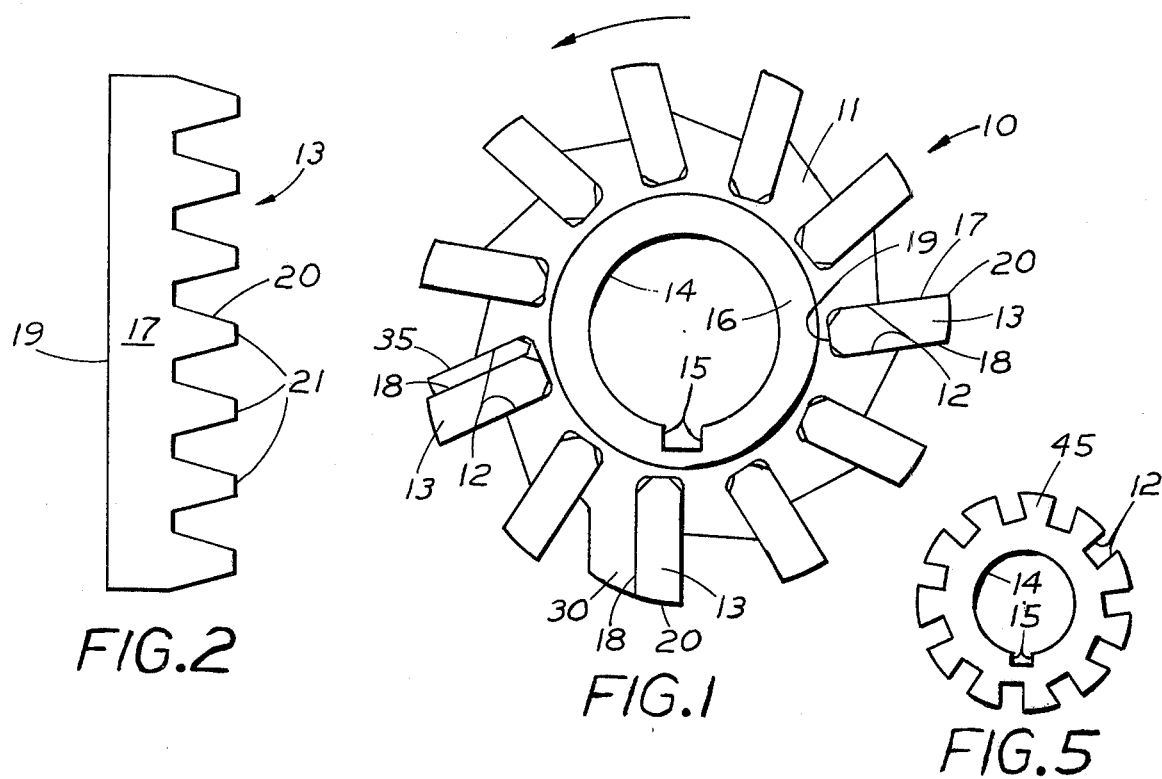
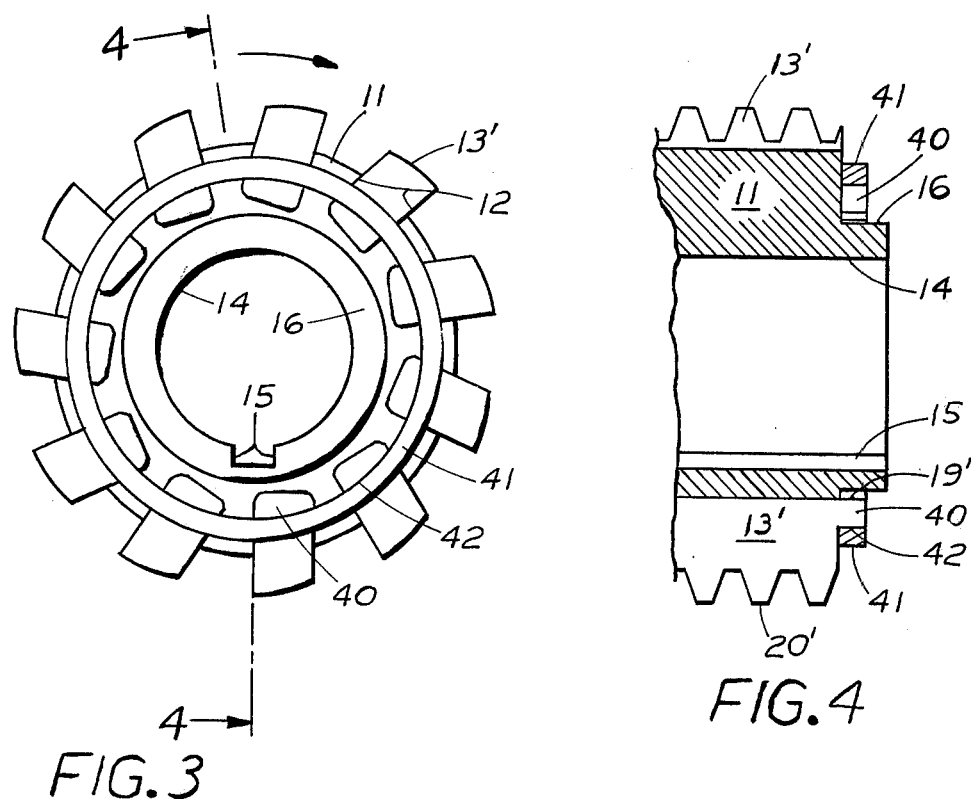

INSERTED BLADE HOB

BACKGROUND OF THE INVENTION

This invention relates to hobs, milling cutters and the like tools. More particularly it relates to such tools with inserted cutting blades.

Inserted blade tools are well-known in the art. Inserted blades have been employed to enable replacement of cutting edges, to simplify grinding of cutting edges, to reduce the amount of expensive cutting material required, to provide a somewhat elastic support for brittle cutting material, and for other reasons. In the past tool steel inserts have had to be retained by mechanical means, such as screw, wedges, clamps, shrink fits and the like because high strength silver soldering, brazing and welding required temperatures in excess of the annealing temperature of the tool steels. The provision of screws, wedges, clamps and like extra components increases material costs, while the additional labor required for their application increases labor costs.

SUMMARY OF THE INVENTION

The hob, or similar tool, of the present invention is significantly less expensive to manufacture because the need for additional components, such as screws, wedges, clamps and the like, is eliminated along with the labor required to apply them. The high temperatures heretofore encountered when such additional components were not employed have become unnecessary. This invention makes possible the quick, easy and inexpensive production of inserted blade tools without the use of fixtures or high annealing or distorting temperatures. The inserted blades may be easily removed. Provision is made for an additional safety factor.

BRIEF DESCRIPTION OF THE DRAWINGS

FIG. 1 is an end view of an inserted blade hob in accordance with this invention, illustrating several embodiments.

FIG. 2 is a profile view of a typical cutting blade as employed in FIG. 1.

FIG. 3 is an end view of an inserted blade hob in accordance with another embodiment of the invention.

FIG. 4 is a partial sectional view taken substantially along the line 4—4 in FIG. 3.

FIG. 5 is a plan view of a lamination employed in one embodiment.

DESCRIPTION OF THE PREFERRED EMBODIMENTS

Referring to FIG. 1, a hob 10 has a generally cylindrical core 11, on the outer periphery of which are a plurality of axially extending, spaced slots 12 receiving cutting blades 13. A circular bore 14 extends axially through the center of the hob to receive the arbor of a hobbing machine. A keyway 15 is provided to receive a key for drivingly engaging the hob to the arbor. A hub 16, extending beyond the core, surrounds the bore.

Each of the cutting blades 13 comprises parallel front and back surfaces 17, 18, respectively, and a bottom 19 to be snugly received in slots 12 preferably with less than 0.003 inch clearance at each side. The cutting blades are bonded to the core by a high-strength adhesive, the strength of the bond being dependent upon the clearance provided among other things. The cutting edge 20 is finished ground, or otherwise shaped, to the desired profile. As shown in FIG. 2, the profile comprises a plurality of teeth 21, as in a hob.

Additional support for the cutting blade 13 may be provided in a modification by a projection 30 from the core 11 along the back surface 18 of the cutting blade. As an alternative, a back-up blade 35 may be inserted in the slot 12 at the back surface 18 of the cutting blade 13 are bonded therein. These additional supports permit the cutting blades to be repeatedly sharpened without weakening them to the point of failure. It is to be understood that only one of the embodiments shown in FIG. 1 is ordinarily employed on any one hob.

FIGS. 3 and 4 illustrate a further modification. The core 11 is substantially the same as in FIG. 1, so the same reference numerals are employed. The cutting blade 13' is the same as in FIG. 2 except for an extension 40 beyond each end of the core 11 and adjacent the bottom 19' of the cutting blade. The cutting blades are bonded into the slots 12 with the extensions overlying the hub 16. A ring 41, preferably in circumferential tension, engages a shoulder 42 on each extension from an end of the core to prevent separation of cutting blades 13' from core 11 in the event of bond failure. This is merely an additional safety factor and is not relied upon to retain the cutting blades and back-up blades, if any, on the core.

FIG. 5 shows a lamination 45 having a bore 14, keyway 15 and slots 12, as in FIGS. 1 and 3. The lamination is stamped from a material suitable for the core and stacked and welded, riveted, or otherwise connected to form a core 11.

The cutting blades may be made of high speed tool steel such as the well-known M2, M3, M42, T1 and T15. The core may be made of a tough, easily machinable, relatively inexpensive material with stable dimensions and a thermal coefficient of expansion comparable to that of the cutting blades. A.I.S.I. 4140 alloy steel has been found satisfactory in combination with the high speed tool steels identified above. The bonding resin may be of a high shear strength, structural, single component, anaerobic, self-curing resin such as polyester or acrylic. LOCTITE R/C 35 is an example of a polyester adhesive having a tensile shear strength of 4000 pounds per square inch with 0.003 inch maximum clearance between steel parts at the bond line. It will cure at room temperature but a heat cure at 200°–300° F provides greater strength in a much reduced time. An example of an acrylic adhesive is LOCTITE 317, having a tensile shear strength of 3500 pounds per square inch with 0.002 inch maximum clearance at the bond line when heat cured at 200°–300° F. Curing at room temperature takes much longer and does not develop such high strength. This adhesive is characterized by high early strength and full resistance to all cutting or lubricating oils and solvents.

METHOD

The core 11 and hub 16 may be turned from solid steel or other suitable material. The slots 12 may be milled, the bore 14 bored, and the keyway 15 broached. Alternatively the core 11 with slots 12, bore 14 and hub 16 (if any) could be at least rough formed by casting, forging, extruding, or pressing and sintering from powdered metal, after which it can be finished, if necessary, as if made from a solid material. The core 11 with slots 12, bore 14 and keyway 15 could be assembled from stacks of aligned laminations 45 fastened together as by rivets, welding, brazing, soldering, adhesive bonding, or the like. The method by which the core 11 is made is not involved in this invention. It is only necessary that the finished part be capable of use as a core and that the slots have substantially parallel sides and a width providing satisfactory clearance for the blades to be inserted therein. The clearance should preferably be no more than 0.003 inch on a side. More clearance will reduce the strength of the bond between the blades and the core and permit less accurate positioning of the cutting blades 13 in the slots.

The cutting blades 13 are formed with parallel front and back surfaces 18, 19 as by cutting from plates. The surfaces should be flat and clean. The rough or final contour of the cutting edge 20 may or may not be present before the blades are inserted into the slots 12. The method of formation is of no concern.

The high shear strength adhesive is applied to both sides of the slots 12 and to the front and back surfaces 18, 19 where they will be forming an interface with the sides of the slots. The blades are then inserted in the slots. If the adhesive has high early strength, as does LOCTITE 317, no further means for retaining the blades in the slots prior to curing is required. If the adhesive, such as LOCTITE R/C 35, is not of the high early strength type, a drop or so of a quick-set, or pressure sensitive adhesive, such as the cyano-acrylate resin type sold as SUPERBONDER 03 or 06 or EASTMAN 910, in the bottom of the slots or on the bottom 19 of the blades and pressing the blades against the bottom of the slots will retain the blades in the slots prior to curing. The quick-set adhesive is not relied upon to retain the blades in the slots after curing of the high shear strength adhesive. Fixtures are not required when such procedure is followed. The high-strength adhesive mentioned will cure at room temperature in several days, but will not develop the highest tensile shear strength. Curing at 300° F is accomplished in 5 minutes, and at 200° F in an hour.

After curing the adhesive, the cutting edge 20 may be finish ground to the desired contour. The hob, or similar tool, is now ready for use.

If it should be desirable to remove the inserted blades from the slots, it can easily be accomplished by heating the assembly to destroy the bond. This is accomplished at 700° F with the adhesives mentioned.

When an additional safety factor is desired, the cutting blades 13 are formed with the extensions 40, and the method above described is followed. The extensions, protruding beyond the end of the core 11 in a discontinuous circle, are preferably ground or otherwise machined to a predetermined close tolerance diameter, after which a ring 41 is pressed, shrunk or otherwise secured to encompass the protruding extensions and prevent the cutting blades 13 from leaving the slots 12 in the event of bond failure. The ring is preferably maintained in circumferential tension, as when it has been pressed or shrunk in place.

The temperatures involved are well below those that may distort or anneal a tool steel cutting blade or a steel core.

The described embodiments are exemplary only. The scope of the invention is defined by the claims.

We claim:

1. An inserted blade hob comprising a core, a preformed slot in the outer periphery of said core and extending axially substantially the length of said core, an elongated cutting blade disposed lengthwise in and extending radially from the preformed slot, substantially parallel front and back surfaces on the blade received snugly in said slot, and a thin layer of high shear strength adhesive in and extending substantially the entire length of the interface between said front and back surfaces of the blade and said slot bonding said cutting blade to the core.

2. An inserted blade hob according to claim 1 wherein a plurality of said cutting blades bonded in respective ones of a plurality of said slots spaced around the core have extensions protruding beyond an end of said core, and further comprising a ring encompassing said extensions to provide additional retaining means for the cutting blades.

3. An inserted blade hob according to claim 2 wherein said ring is maintained in circumferential tension around the extensions.

* * * * *

UNITED STATES PATENT OFFICE
CERTIFICATE OF CORRECTION

Patent No. 4,023,246  Dated May 17, 1977

Inventor(s) Edward W. Haug and Charles E. Beck

It is certified that error appears in the above-identified patent and that said Letters Patent are hereby corrected as shown below:

In column 4, line 28, change "from" to -- front --.

Signed and Sealed this sixteenth Day of August 1977

[SEAL]

Attest:

RUTH C. MASON  
Attesting Officer

C. MARSHALL DANN  
Commissioner of Patents and Trademarks